L. T. BLAKE.
MILKING COWS.

No. 61,509. Patented Jan. 29, 1867.

Witnesses:
John N. Shumway
A. J. Tibbits

Inventor:
Lem. T. Blake
his atty
John E. Earle

United States Patent Office.

LEWIS T. BLAKE, OF NEW HAVEN, CONNECTICUT.

Letters Patent No. 61,509, dated January 29, 1867.

IMPROVEMENT IN MILKING COWS.

*The Schedule referred to in these Letters Patent and making part of the same.*

---

TO ALL WHOM IT MAY CONCERN:

Be it known that I, LEWIS T. BLAKE, of New Haven, in the county of New Haven, and State of Connecticut, have invented a new Improvement in Apparatus for Milking Cows; and I do hereby declare the following, when taken in connection with the accompanying drawings and the letters of reference marked thereon, to be a full, clear, and exact description of the same, and which said drawings constitute part of this specification, and represent, in—

Figure 1:
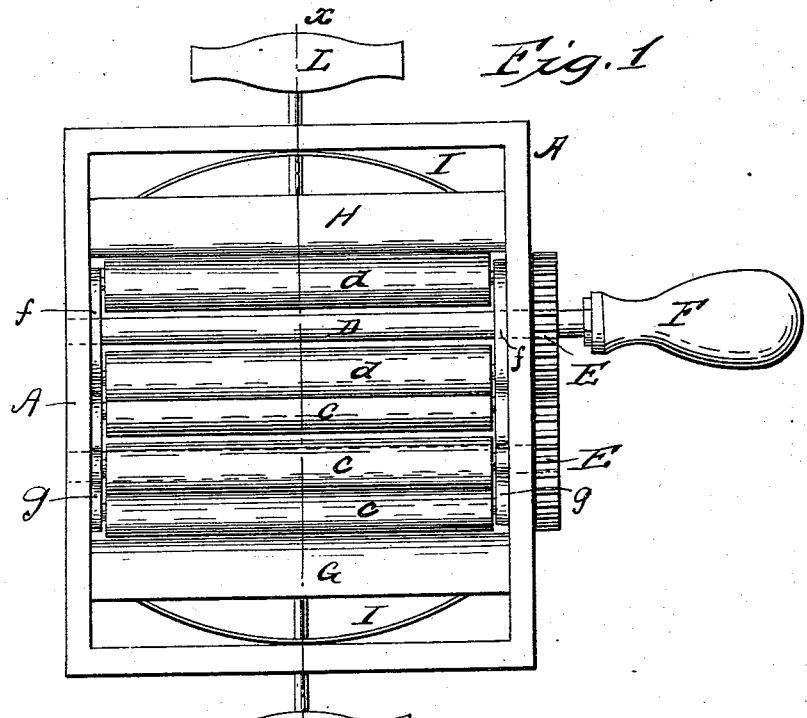
Figure 2:
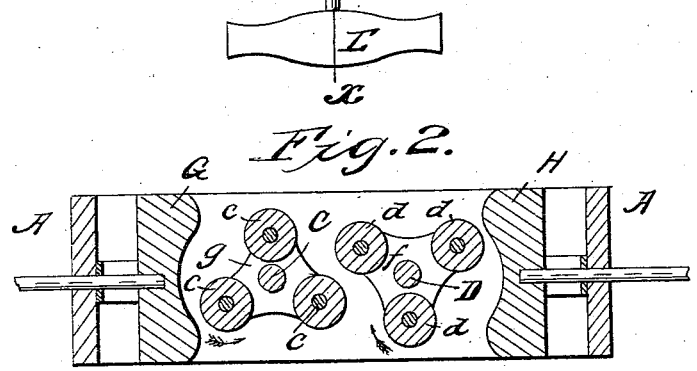

Figure 1, a top view.
Figure 2, a vertical section cutting through $x\,x$; and in
Figure 3, the operation.

My invention is designed for mechanically milking cows, and consists in the arrangement of revolving rolls in combination with pressure-plates, so that the teats, when placed between the rolls and plates, are pressed upon, and by the rotation of the rolls the milk is forced out in much the same manner as milking by hand, whereby the objections which exist to other apparatus are entirely overcome.

To enable others skilled in the art to construct and use my improvement, I will proceed to describe the same as illustrated in the accompanying drawings.

Figure 3:
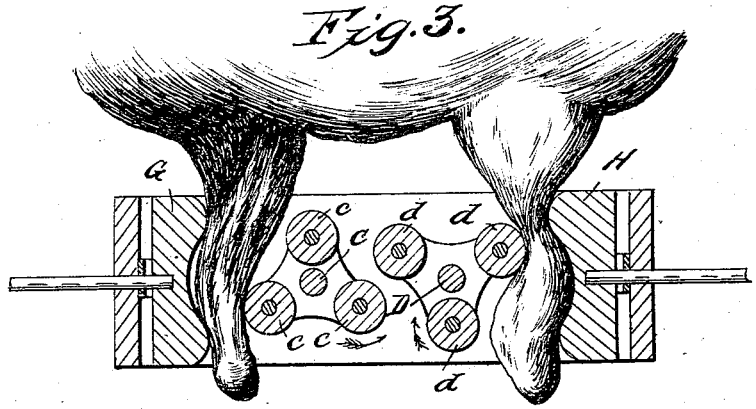

A is a frame, supported upon legs the proper height to bring the apparatus into the proper relative position to the cow, and through the said frame pass two shafts, C and D, connected together by gears, E, to one of which a crank, F, is attached, so that the two revolve in opposite directions. Upon each of the said shafts are fixed two heads, $f$ and $g$, carrying in proper bearings three rolls, $c$ and $d$, more or less in number, and so that by turning the shafts C and D one set of the rotating rolls will not interfere with the other. G and H are two pressure-plates, arranged parallel with the rotating rolls, and upon opposite sides. The said plates are self-adjusting by means of springs, I, I, and should be of nearly the form as seen in figs. 2 and 3, so as to conform somewhat to the movement of the rotating rolls, and at the same time to be no discomfort to the animal. To each of the said plates handles, L L, are fixed, or other convenient arrangement for opening the said plates. This completes the construction of my apparatus, and its operation is as follows:

Each two of the four teats are respectively placed between the rotating rolls and the pressure-plates, as denoted in fig. 3; then by rotating the rolls, as denoted by arrows, the teats are first pressed near their upper end as denoted by the roll $d'$, and the continued rotation presses the teat downward and towards the lower end, as denoted by the roll $c'$, thus compressing and drawing the teat much in the same manner as when milking by hand. The continued rotation of the rolls brings each successive roll against the teats and drawing down in like manner, the pressure plates G and H adjusting themselves to maintain the same pressure upon all the teats, which pressure may be increased or diminished by increasing or reducing the pressure of the springs, which may be done if necessary in various and well-known ways. A single set of rolls and single plate may be used, in which case the two teats can be drawn at the same time.

Having therefore thus fully described my invention, what I claim as new and useful, and desire to secure by Letters Patent, is—

The combination of one or more sets of rolls $c$ or $d$, rotated in the manner described, with their respective pressure-plates G or H, substantially as and for the purpose specified.

LEWIS T. BLAKE.

Witnesses:
JOHN E. EARLE,
A. J. TIBBITS.